United States Patent
Polyakov et al.

(10) Patent No.: US 11,263,021 B2
(45) Date of Patent: Mar. 1, 2022

(54) MANAGEMENT PLATFORM RECOVERY FOR A USER DEVICE

(71) Applicant: VMware, Inc., Palo Alto, CA (US)

(72) Inventors: Alexey Polyakov, Sammamish, WA (US); Nitin Rao, Atlanta, GA (US); Nikhil Ravishankar, Bangalore (IN); Xueliang Hua, Atlanta, GA (US); Shravan Shantharam, Cumming, GA (US); Ondrej Stastny, Kirkland, WA (US); Brooks Peppin, Colorado Springs, CO (US)

(73) Assignee: VMware, Inc., Palo Alto, CA (US)

( * ) Notice: Subject to any disclaimer, the term of this patent is extended or adjusted under 35 U.S.C. 154(b) by 338 days.

(21) Appl. No.: 16/418,282

(22) Filed: May 21, 2019

(65) Prior Publication Data

US 2020/0371816 A1 Nov. 26, 2020

(51) Int. Cl.
*G06F 9/4401* (2018.01)
*G06F 12/0806* (2016.01)
*G06F 8/654* (2018.01)

(52) U.S. Cl.
CPC ........ *G06F 9/4406* (2013.01); *G06F 12/0806* (2013.01); *G06F 8/654* (2018.02); *G06F 2212/1032* (2013.01)

(58) Field of Classification Search
CPC ......... G06F 12/0806; G06F 2212/1032; G06F 8/63; G06F 8/654; G06F 9/4406
See application file for complete search history.

(56) References Cited

U.S. PATENT DOCUMENTS

| 9,146,749 | B1 | 9/2015 | Sivertsen |
| 9,519,504 | B2 * | 12/2016 | Apte ................... G06F 9/45533 |
| 10,257,177 | B2 | 4/2019 | Hwang |

(Continued)

FOREIGN PATENT DOCUMENTS

WO 2012041667 4/2012

OTHER PUBLICATIONS

Liu, Client registers method, apparatus and system, Dec. 18, 2018, Google Patent (Year: 2018).

(Continued)

*Primary Examiner* — Terrell S Johnson
(74) *Attorney, Agent, or Firm* — Clayton, McKay & Bailey, PC

(57) ABSTRACT

Examples described here include systems and methods for refreshing the operating system ("OS") of a device enrolled in a management platform. Execution of a first command file ensures that necessary components of the management platform residing on the device are stored in a partitioned portion of the device hard drive to preserve them during the OS refresh. After a new instance of the OS has been installed, execution of a second command file migrates the necessary components from the partitioned portion of the hard drive to the new OS instance. When the user logs back into the refreshed device, a third command file installs all necessary device management components at the new OS instance and re-enrolls the device with the management platform. In this manner, the OS of a managed device can be refreshed and re-enrolled in the management platform without significant input from a user or administrator.

20 Claims, 9 Drawing Sheets

(56) References Cited

U.S. PATENT DOCUMENTS

| | | |
|---|---|---|
| 10,331,525 B2* | 6/2019 | Earl .................... G06F 11/1451 |
| 10,461,950 B2 | 10/2019 | Verlaan |
| 2004/0044707 A1 | 3/2004 | Richard |
| 2008/0005509 A1 | 1/2008 | Smith |
| 2009/0193102 A1 | 7/2009 | Trujillo |
| 2012/0084601 A1* | 4/2012 | Lee .................... G06F 11/0793 |
| | | 714/15 |
| 2012/0151258 A1* | 6/2012 | Lee .......................... G06F 8/62 |
| | | 714/15 |
| 2013/0298185 A1 | 11/2013 | Koneru |
| 2015/0033072 A1 | 1/2015 | Barr |
| 2015/0341779 A1 | 11/2015 | Dawson-Haney |
| 2016/0350139 A1 | 12/2016 | Gandhi |
| 2017/0230237 A1 | 8/2017 | Maruyama |
| 2017/0317879 A1 | 11/2017 | Wei |
| 2017/0353497 A1 | 12/2017 | Bradley |
| 2020/0026536 A1 | 1/2020 | Li |
| 2020/0034137 A1 | 1/2020 | Zhang |
| 2020/0137070 A1 | 4/2020 | Bhattacharya |
| 2020/0351174 A1* | 11/2020 | Frost .................. H04W 12/086 |

OTHER PUBLICATIONS

International Search Report and Written Opinion for PCT/US2020/033871, dated Aug. 26, 2020.
"File Recovery Basics: How Data Recovery Works", https://web.archive.org/web/20190505320 1/https://www.r-studio.com/file-recovery-basics.html; R-Tools Technology, Inc.,, May 4, 2019, 1-3.

\* cited by examiner

MANAGEMENT PLATFORM RECOVERY FOR A USER DEVICE

BACKGROUND

Computing devices such as a laptops, smart phones, or desktop computers often slow down or cease working properly over a period of use. Installing and removing applications, files, and data leaves remnants of that data in various directories of the device hard drive, which eventually lead to device performance issues. In other instances, the installation of a virus or a corrupted application or update can cause performance issues or prevent aspects of the device from operating altogether. A user may find it necessary to "refresh" or "reset" the device operating system ("OS"). OS developers may include refresh and reset features in their software. As used herein, the term "refresh" includes reinstalling the OS in a way that retains some of the user's personal files, settings, and applications predetermined by the OS developer. The term "reset" includes reinstalling the OS and essentially returning the device to its original, out-of-the-box configuration.

However, in an Enterprise Mobility Management ("EMM") or Mobile Device Management ("MDM") system, both the refresh and reset options pose problems. For example, the management of the device can be broken until certain applications are reinstalled on the device or the device is re-authenticated by a management server. This is not only time consuming, but it can also pose a security risk because a user could potentially modify the device prior to restoration of the management functionality.

In EMM and MDM systems, device management applications are installed on enrolled devices, along with device identifying information and one or more managed applications. For example, a management agent application may be installed on an enrolled device to facilitate communication between the device and a management server. The agent application can also function as, or work in tandem with, a workspace application in which other managed applications operate. This configuration provides a secure, managed environment on the device for managed applications such as an email application, a file sharing application, or a VPN application. Device identifying information, such as a unique device ID, an enrollment key, and authentication tokens, are used to enroll a device with a management server and authenticate communications between the device and the server or an administrator console that is also in communication with the server.

The management applications, device identifying information, and managed applications are all removed from a device during a refresh or reset of the OS. As important, the authenticated communication channel previously established between the device and the management server is lost. This makes re-installation of the necessary management and managed applications, as well as the re-enrollment of the device with the management server by an authenticated communication channel, very burdensome and time consuming for both the device user and an administrator overseeing device management within an enterprise.

As a result, a need exists for systems and methods that allow users of managed devices, as well as enterprise administrators, to quickly restore a previously-configured management platform on devices that have undergone a refresh or reset of its OS.

SUMMARY

Examples described herein include systems and methods for refreshing the OS of a device enrolled in a management platform. An example method includes receiving a request, from either an administrator console or a device, to refresh the OS of the device. Upon initiation of the refresh process, device identification data, one or more management application installation files, and one or more managed application installation files can be stored in a recovery folder of the existing OS. A new instance of the OS can then be installed while retaining the contents of the recovery folder in a partitioned portion of the device hard drive. After creation of the new instance of the OS, the contents of the recovery folder can be migrated over from the partitioned portion of the hard drive to the new OS.

Upon a first login to the device by the user, an unattended answer file can initiate re-installation of the management application(s) and managed application(s) at the new instance of the OS. With the management application(s) re-installed and the device identification data preserved, the device can also be automatically re-enrolled in the management platform and restore communication with a management server.

Backing up and migrating recovery folder contents, as well as re-installing the applications and re-enrolling the device in the management platform, can all be accomplished by a series of command files previously stored on the device. If the command files do not already exist on the device, they can be requested in response to the request to refresh the OS. Once stored on the device, the files can automatically execute in response to the request to refresh the OS without requiring any further configuration by the user or an administrator.

The examples summarized above can also be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for refreshing the OS of a device enrolled in a management platform. A request to refresh the OS is received at the device. Upon receipt, the device can confirm whether the necessary refresh process files are present and stored in a recovery folder of the OS. The refresh process files can include one or more scripts or command files for executing steps during the refresh. If the refresh process files are present, the device can initiate the refresh process by executing a first command file of the refresh process files.

The first command file can store relevant management applications, managed applications, and device identification information to the recovery folder of the device OS. During the refresh, a portion of the device hard drive can be partitioned and the recovery folder can be stored at the partitioned portion to ensure its contents are preserved during the refresh. The remainder of the device hard drive can then be reformatted and a new instance of the OS can be installed.

After installation of the new instance of the OS, a second command file of the refresh process files can be executed that migrates the management applications, managed applications, and device identification information from the recovery folder to the new instance of the OS.

When the device is ready for the user to first login to the refreshed device, the login can initiate execution of a third command file that re-installs the management applications and managed applications to the new OS instance. The third command file can also re-enroll the device in the management platform by providing device identification information to a management server.

This process can be repeated any time a refresh becomes necessary at the managed device. Using the refresh process files, which are automatically executed during the device refresh process, continued management of the device is possible with minimal action required by the user or an administrator overseeing the device's management.

Figure 5:
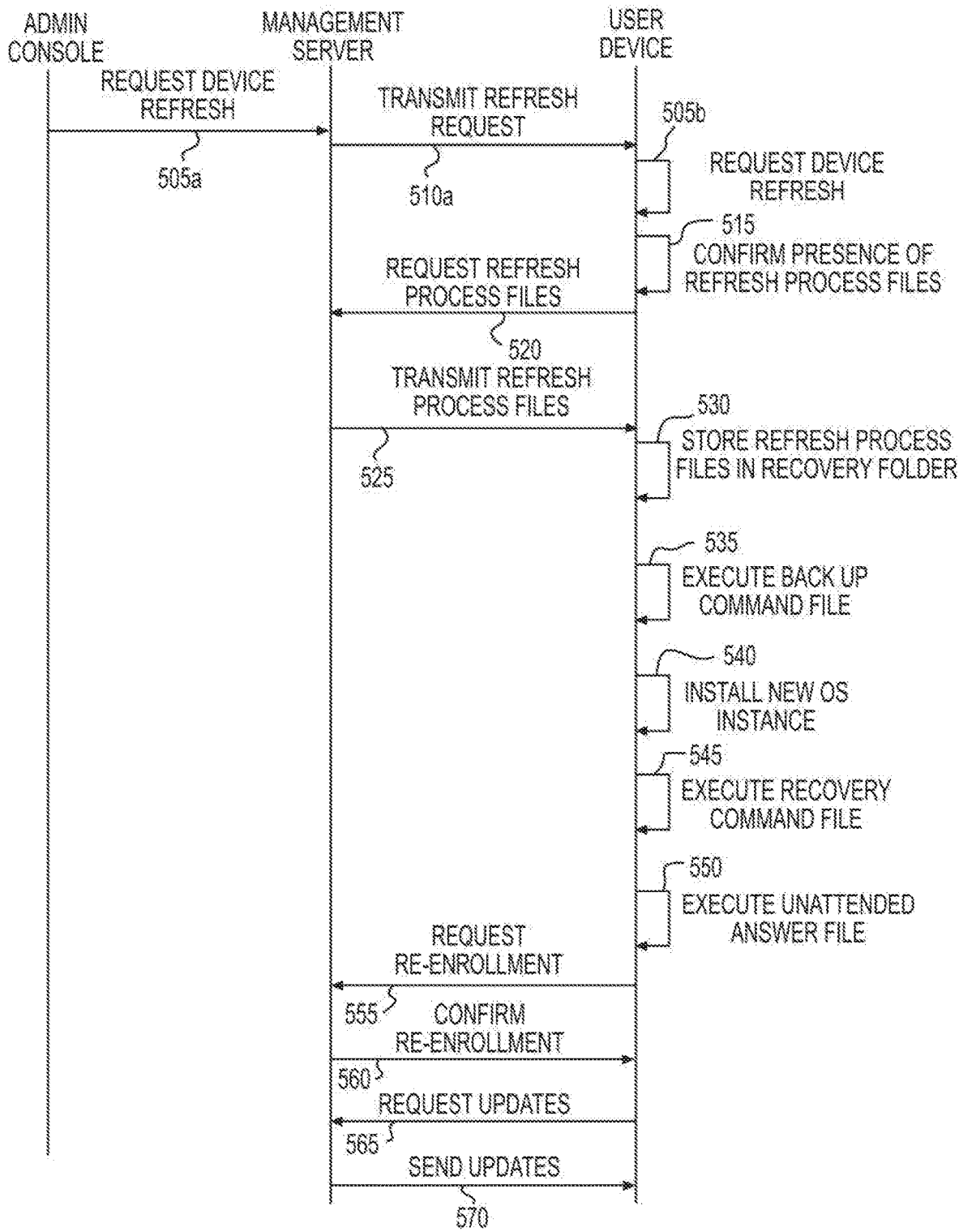
FIG. 5 is a sequence diagram of an example method for refreshing the operating system of a device enrolled in a management platform.
Figure 6:
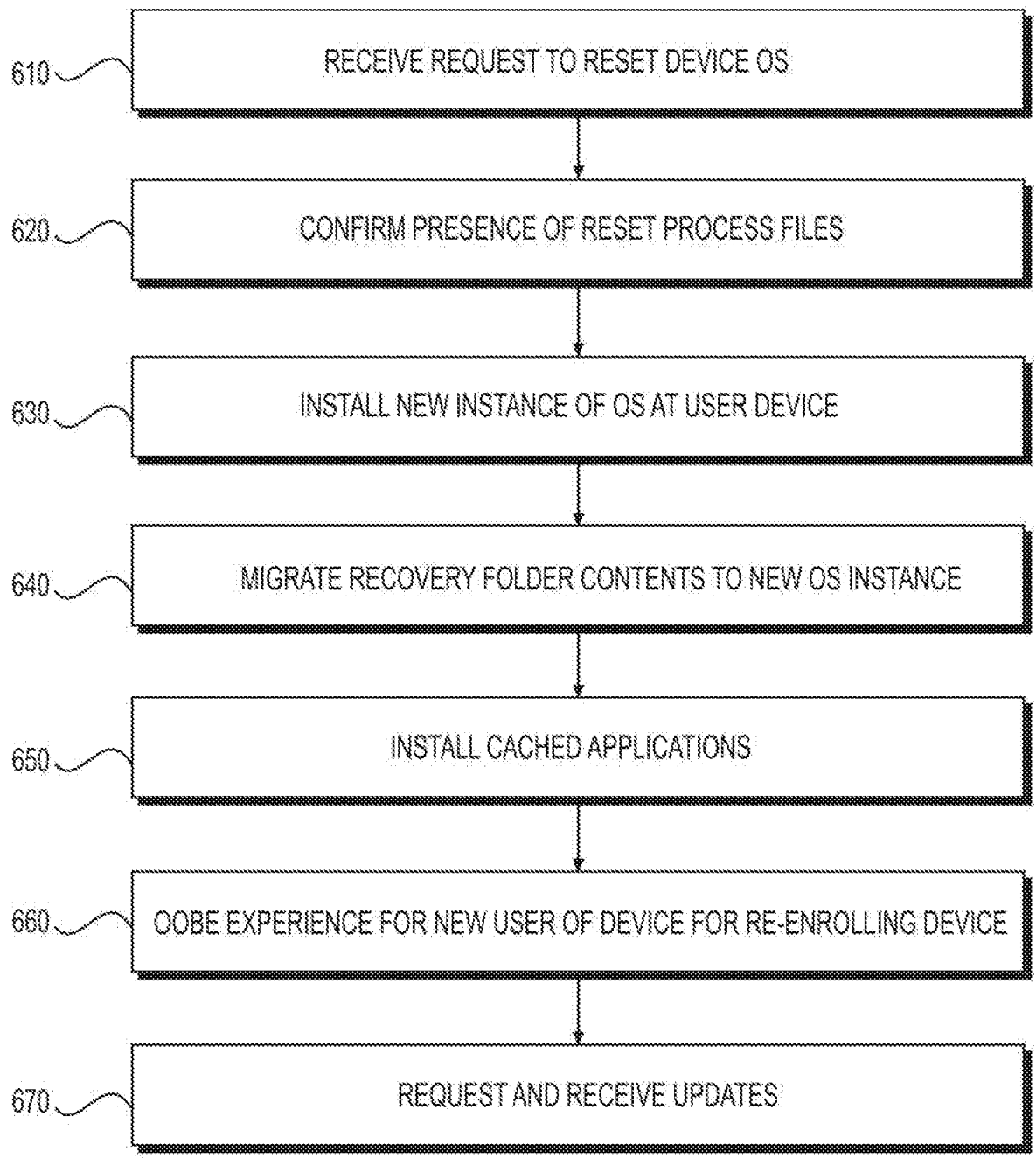
FIG. 6 is a flowchart of an example method for resetting the operating system of a device enrolled in a management platform.
Figure 7:
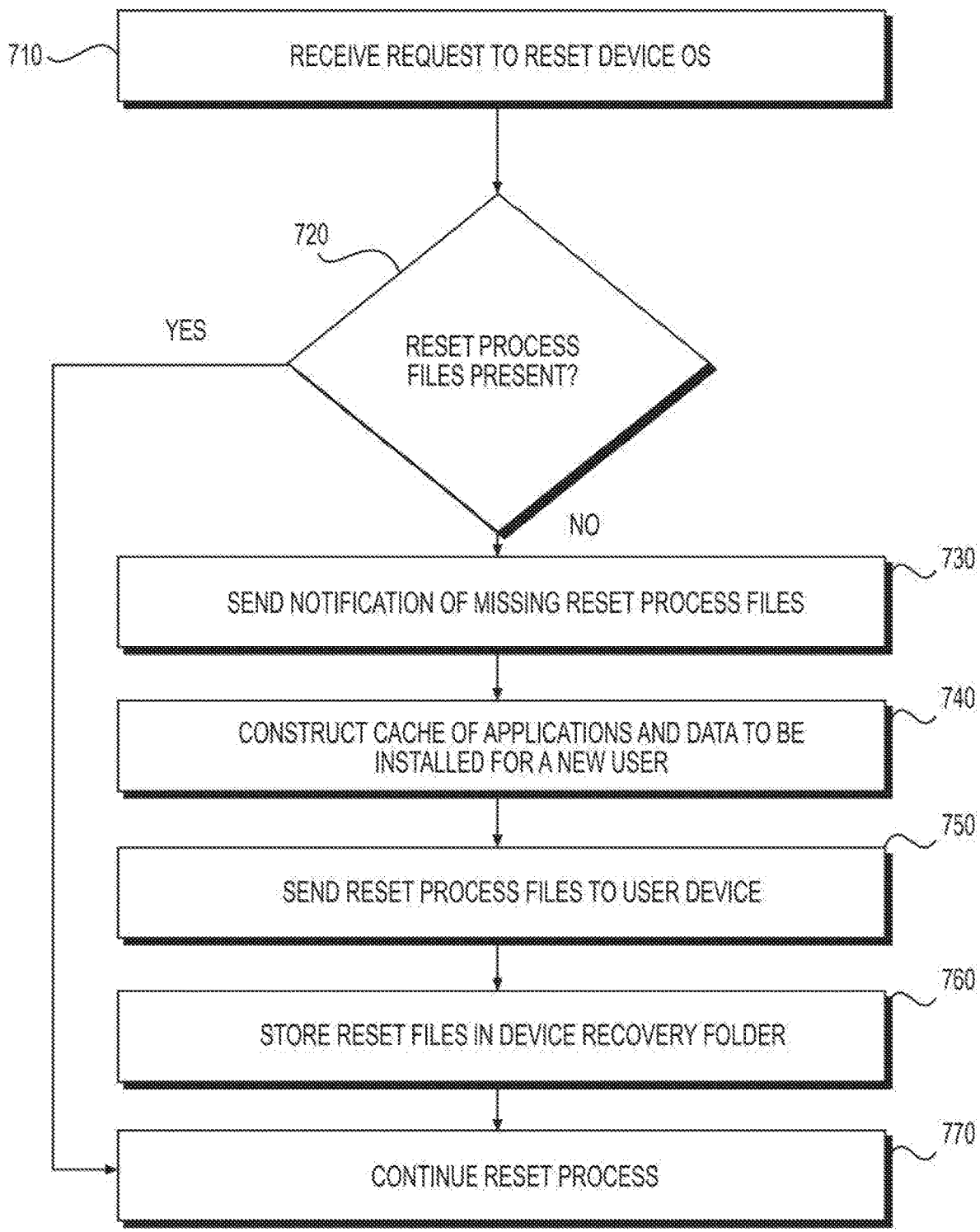
FIG. 7 is a flowchart of an example method for resetting the operating system of a device enrolled in a management platform.
Figure 8:
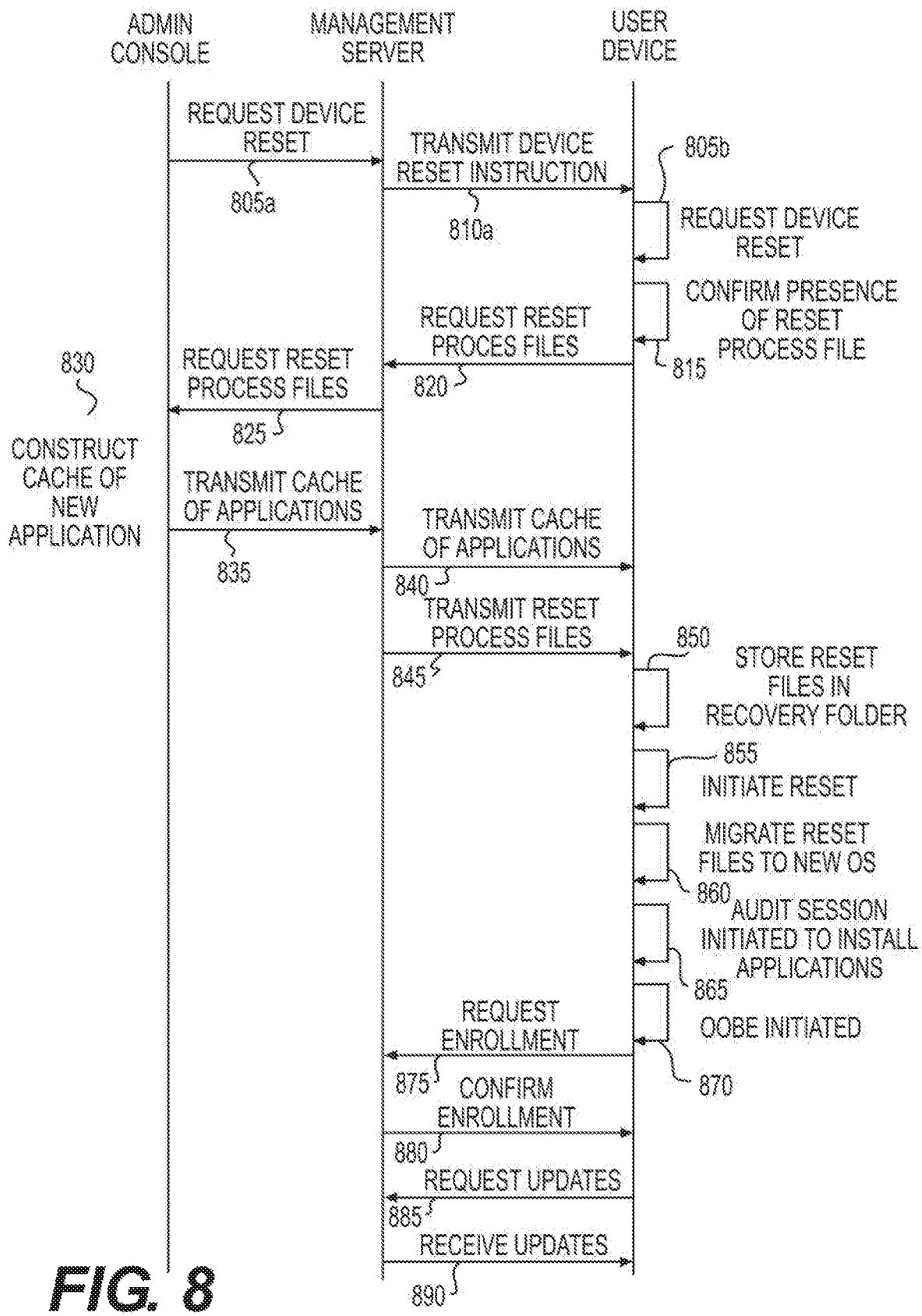
FIG. 8 is a sequence diagram of an example method for resetting the operating system of a device enrolled in a management platform.
Figure 9:
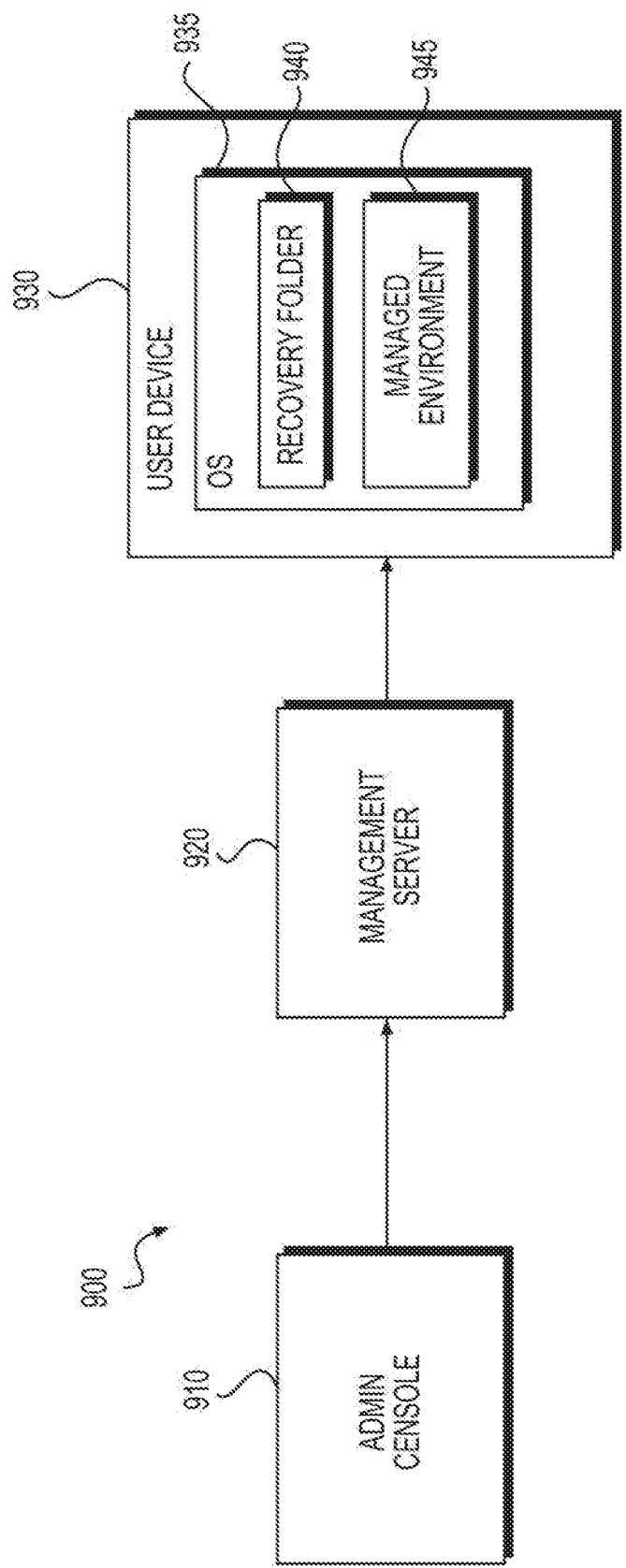
FIG. 9 is a system diagram of an example system for refreshing or resetting the operating system of a device enrolled in a management platform.

FIGS. 1-4 provide a flowchart of example methods for refreshing the OS of a device enrolled in a management platform. FIG. 5 provides a sequence diagram of example methods for refreshing the OS. FIGS. 6 and 7 provide a flowchart of example methods for resetting the OS of a managed device. FIG. 8 provides a sequence diagram of example methods for resetting the OS. FIG. 9. provides an example system for either refreshing or resetting the OS of a managed device.

Figure 1:
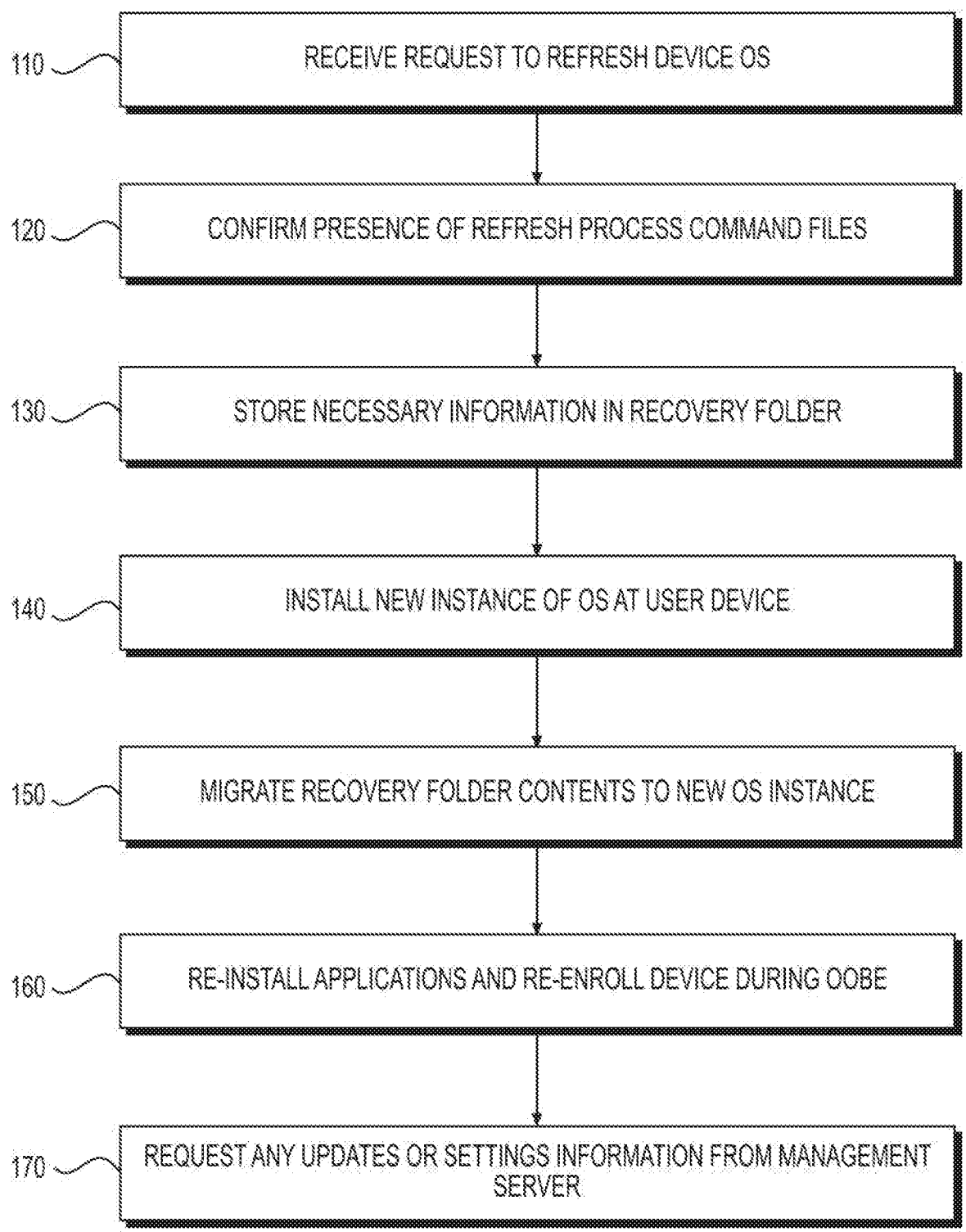
FIG. 1 is a flowchart of an example method for refreshing the operating system of a device enrolled in a management platform.

Turning to FIG. 1, a flowchart for carrying out the various methods described herein is depicted. At a first step 110, a request to refresh the OS of a device is received at the device. In some examples, the request can be initiated by an administrator at an administrator console. The administrator console can communicate the request to a management server that relays the request to the device.

In further examples, the management server communicates with a management agent application installed at the device. The communication channel between the management server and the agent application can be established during a prior device enrollment process. During the enrollment process, device identification information can be sent from the device to the management server, including one or more of an enrollment key and an authentication token. In this manner, the management server can both identify the managed device and authenticate communications received from the device.

In an alternative example, the request to refresh the OS can be initiated at the device by a user, without communication with the management server or the administrator console. It should be noted, however, that a communication channel between the device and the management server would already have been established in the device enrollment process described above. In another example, a request to refresh the OS can be sent from the device to the administrator console through the management server. The administrator can approve the request and send an approval to the device, again through the management server.

At step 120, the device can confirm that one or more refresh process files are stored in a recovery folder of the device OS. The recovery folder will be preserved during the OS refresh, as described in more detail below. The refresh process files include command files that can be executed at particular points in an OS refresh process to ensure that the device can be automatically re-enrolled in the management platform upon completion of the OS refresh. The refresh process files can include a backup command file, a migration or recovery command file, and an unattended answer file containing re-installation and re-enrollment command files.

Once it is confirmed that all the refresh process files are present, the OS refresh process continues to step 130. There, a first command file—the backup command file—can be executed. Execution of the backup command file ensures that copies of elements of the device management platform that are necessary to re-enroll the device are saved to the recovery folder. Further details regarding execution of the backup command file are discussed below with respect to FIG. 3.

After the back-up command file has executed and the elements needed to re-enroll the device have been stored in the recovery folder, the OS refresh process continues to step 140. There, a portion of the hard drive of the device is partitioned and the recovery folder and its contents are saved in the partitioned portion. The information stored at the partitioned portion of the hard drive can be preserved during the OS refresh. The remainder of the hard drive can then be reformatted and a new instance of the OS can be installed there.

At step 150, the second command file—the migration or recovery command file—is executed. In some examples, the recovery command file ensures that information stored in the recovery folder is migrated from the partitioned portion to the new OS instance. The recovery command file can execute without any further input from the user or administrator beyond the initial request to refresh the OS. For example, execution of the recovery command file can be triggered by completion of the installation of the new instance of the OS or some other event indicating that the new instance of the OS is in place. Further details regarding execution of the recovery command file are discussed with respect to FIG. 4.

At step 160, the device is now configured for an "Out of the Box Experience" ("OOBE"). The OOBE includes the workflow or series of screens and requests for information that a user encounters when first logging into a new device. During the OOBE, one or more additional elements of the new OS instance can be installed and one or more features of the device can be customized by the user. It is during the OOBE that the third command file—the unattended answer file—is executed. The file is referred to as "unattended" because it does not require direct input from the user or administrator during execution. The unattended answer file can include scripts including a re-installation command file and a re-enrollment command file.

Execution of the unattended answer file can be triggered upon commencement of the OOBE or by the occurrence of an event that occurs during the OOBE. In one aspect, the re-installation command file will execute the installation files associated with the management applications and managed applications that were migrated over to the new OS instance. The new location of these new application instances within the new OS instance can be specified by the re-installation command file. The re-installation command file can also contain settings information to be applied to each of the management and managed applications following install.

Upon installation of the management applications, the re-enrollment command file can execute and, using the migrated device identification information, re-enroll the device with the management server. In these examples, all applications and data that were necessary to maintain the prior instance of the management platform on the device and enable communication with the management server are already present in the new OS instance.

Once the device is re-enrolled in the management platform and the management and managed applications are installed at the device, the device can transmit a message confirming the OS refresh was successful to the management server or the administrator console. At step 170, the device can also send a request to the management server for any application or settings updates that may have been received by the management server from the administrator console but have not yet been applied to the applications and settings of the device since the OS refresh.

If any updates exist, the management server can transmit those to agent application of the device to be installed or applied. Once this update procedure is complete, the device is effectively restored to its pre-refresh configuration. Importantly, the re-enrollment process, including installation of all management and managed applications, can be accomplished during the OS refresh without significant input from the user or administrator beyond providing the initial instruction to refresh the OS.

Figure 2:
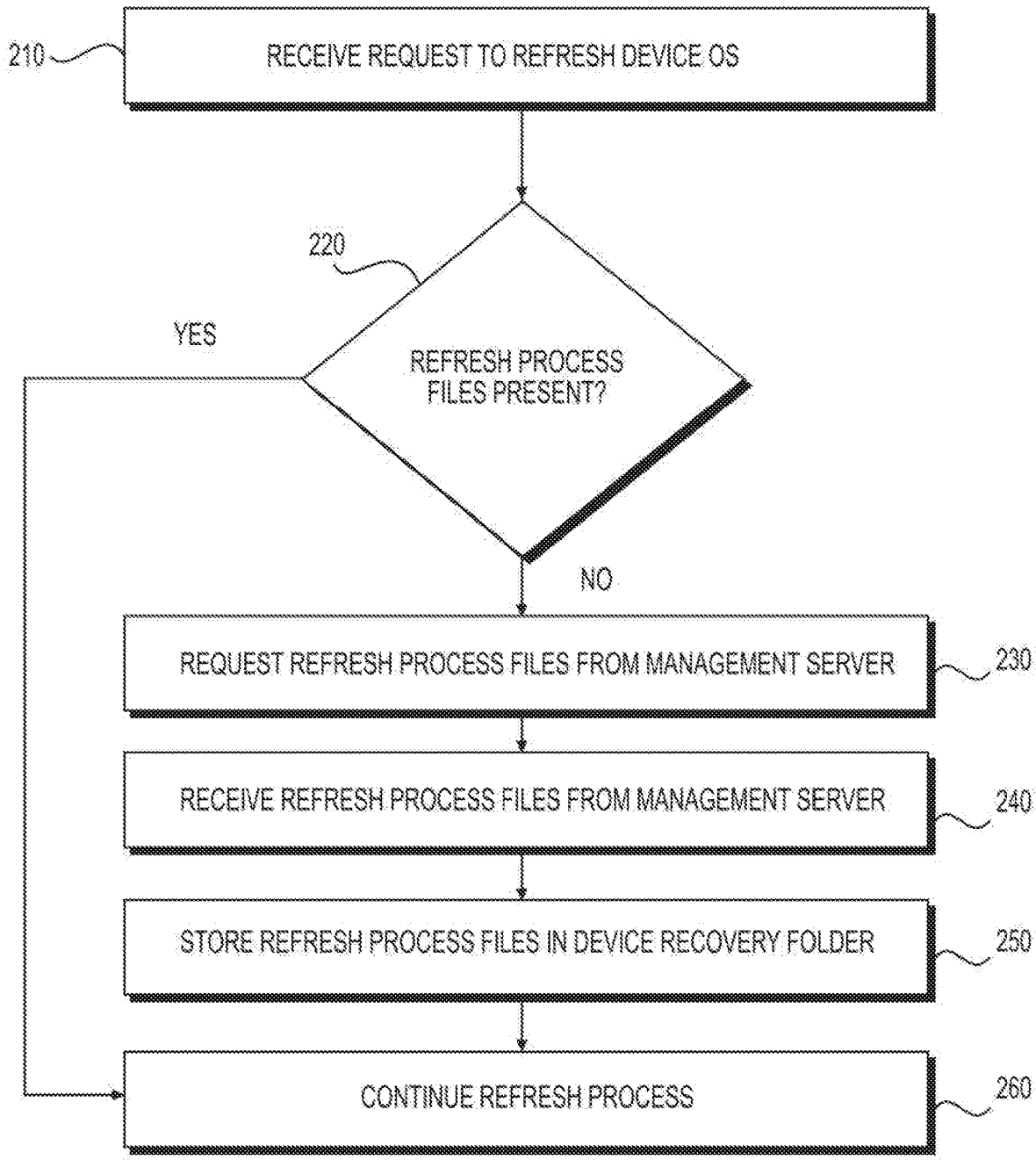
FIG. 2 is a flowchart of an example method for refreshing the operating system of a device enrolled in a management platform.

FIG. 2 depicts a process for confirming the presence of the refresh process files in the recovery folder, described above with respect to step 120 of FIG. 1. At step 210, a request to refresh the OS is received at the device. As discussed previously, this request can be initiated at an administrator console and relayed to the device through a management server or the request can be initiated by the user at the device.

At step 220, the device can determine if the refresh process files are present in the recovery folder. If they are present, then the process advances to step 260 and the refresh process continues to step 130 of FIG. 1, as described in more detail below. If the refresh process files are not present in the recovery folder, the device can transmit a request to the management server for the recovery files at step 230. For example, the device can first confirm the presence of each of a back-up command file, a migration or recovery command file, and an unattended answer file containing re-installation and re-enrollment command files. Where one or more of such files are missing, the device can request the missing files from the management server. In a further example, even when all the refresh process files are present in the recovery folder, the device can request any updates to those files from the management server.

At step 240, the management server sends the requested refresh process files to the device. Again, the management server may send all of the requested refresh process files to the device or some subset, depending on which files are missing or in need of an update at the device. The transmission of the refresh process files by the management device may or may not be performed without requiring any action by an administrator at an administrator console. In some examples, the management server may send a request to authorize transmission of the refresh process files to the administrator console and refrain from sending the files to the device until a confirmation from the administrator console is received.

Once the requested refresh process files have been sent to the device, at step 250, the device can store the received files in the recovery folder for use during the refresh process. The refresh process can then continue at step 260.

Figure 3:
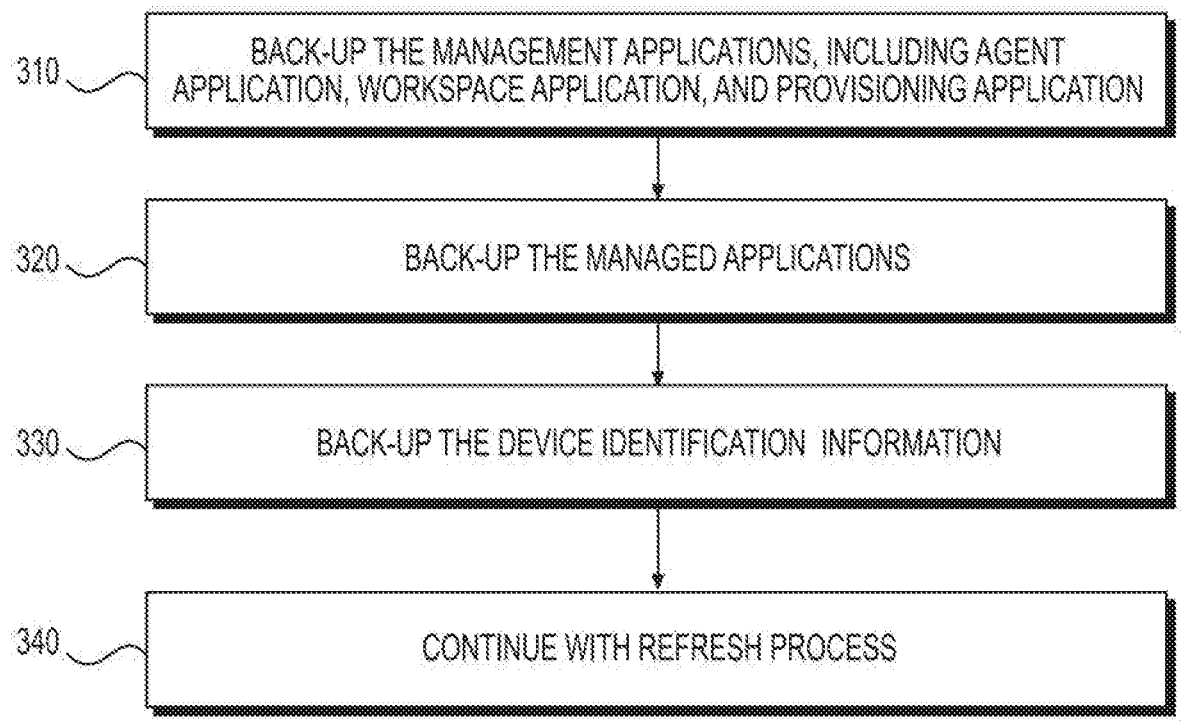
FIG. 3 is a flowchart of an example method for refreshing the operating system of a device enrolled in a management platform.

FIG. 3 provides further details regarding the backup process described above with respect to step 130 of FIG. 1. At step 310, copies of installation files associated with one or more management applications are stored in the device recovery folder. The management applications can include a management agent application, a management workspace application, and a management provisioning application. The agent application is described above and serves to facilitate communication between the device and the management server and, by extension, the administrator console. The workspace application provides a secure environment on the device within which the one or more managed applications can operate. In this manner, the user need not provide credentials or authentication information for each managed application running on the device. Rather, authentication of the workspace application is ensured and the user can access managed applications within the workspace environment without encountering further authentication requirements. The management provisioning application can configure the settings of managed applications operating within the workspace environment. In some embodiments, the agent application, workspace application, and provisioning application are all embodied in a single application.

At step 320, copies of installation files associated with one or more managed applications are stored in the recovery folder. The managed applications can be any applications installed on the device that are under management. For example, the managed applications can include an email application, a WiFi application, a VPN application, a file manager application, and a word processor application.

Device identification information is also stored in the recover folder at step 330. The device identification information can include, but is not limited to, a device ID uniquely identifying the device, one or more management platform enrollment keys, and one or more authentication tokens to be used to authenticate communications with the management server. After the device identification information and the installation files for the management and managed applications are stored in the recover folder, the refresh process continues at step 340.

Figure 4:
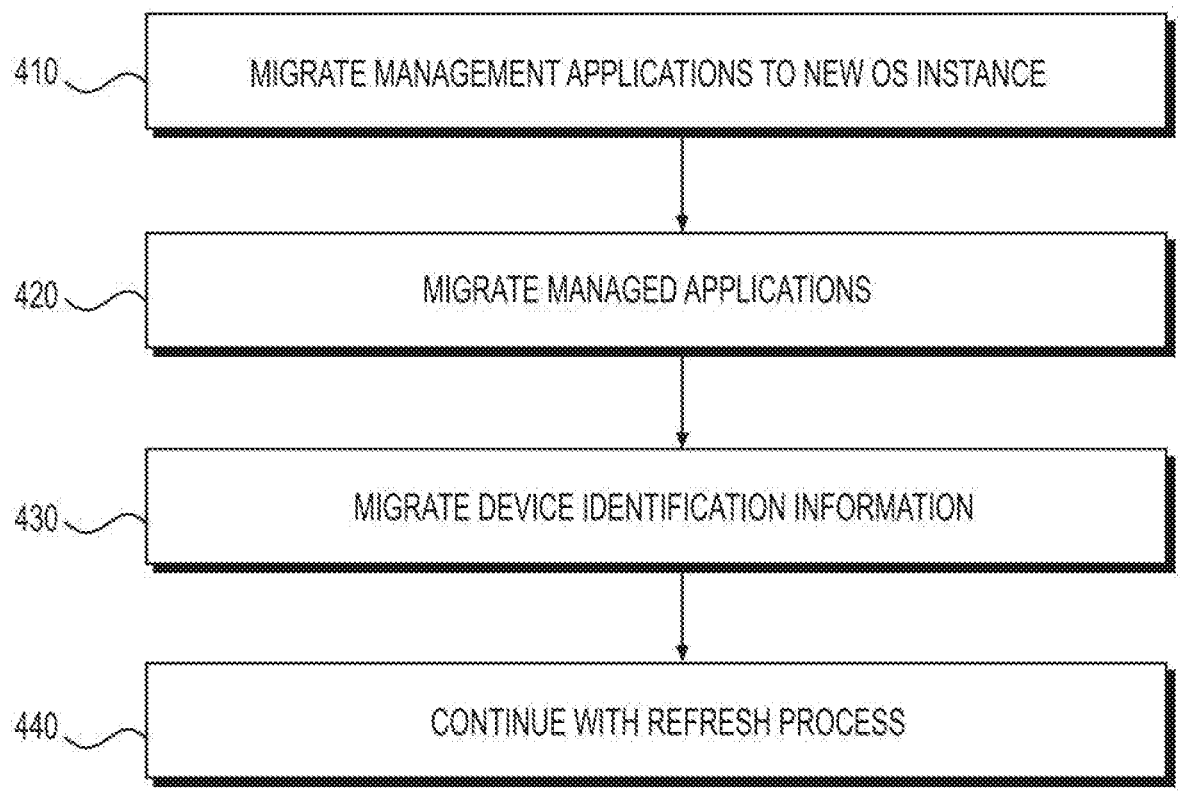
FIG. 4 is a flowchart of an example method for refreshing the operating system of a device enrolled in a management platform.

FIG. 4 provides further details regarding the migration process initiated by the execution of the recovery command file, described above with respect to step 150 of FIG. 1. At step 410, the installation files associated with the management applications are migrated from the recovery folder to an appropriate location in the new OS instance. As discussed above, the management applications can include the agent application, the workspace application, and the provisioning application. In some examples, the location at which the installation files will be stored in the new OS instance can be specified by the recovery command file. The recovery command file can specify a location reflective of where the information was stored in the prior instance of the OS.

At step 420, the installation files associated with the managed applications can be similarly migrated to the new OS instance. Again, the new location of the managed application installation files can be specified in the recovery command file and doesn't necessarily need to be the same location as the installation files associated with the managed application installation files.

The device identification information is also migrated from the recovery folder to the new OS instance at step 430. As discussed above, the device identification information can include the device ID, one or more management platform enrollment keys, and one or more authentication tokens to be used for communication with the management server. In further embodiments, any information necessary to re-enroll the device with the management server is included in the device identification information. The location in the new OS instance to which this information is migrated can be specified by the recovery command file.

In some embodiments, some contents of the recovery folder will not be migrated to the new OS. For example, the refresh process files, including the back-up command file, the recovery command file, and the unattended answer file may not be migrated to the new OS. Rather, those files can be executed from the recovery folder during the refresh process and may not be needed in the new OS instance. Alternatively, the refresh process files can also be migrated upon execution of the recovery command file for use in a future refresh process.

After the device identification information and the installation files for the management and managed applications are migrated to the new OS instance, the refresh process continues at step 440.

FIG. 5 depicts a sequence diagram of an example method for refreshing the operating system of a device enrolled in a management platform. At stage 505a, a request to refresh the OS is generated at administrator console. The request is received by a management server and transmitted to the appropriate device at stage 510a. In alternative embodiments, at stage 505b, the request to refresh the OS is generated by the user at the device rather than by an administrator at the administrator console.

At stage 515, the device confirms the refresh process files are stored in the device's recovery folder. These files can include a back-up command file, a migration or recovery command file, and an unattended answer file. In some examples, the unattended answer file can contain a re-installation command file and a re-enrollment command file.

If one or more of the refresh process files are not found in the recovery folder, at stage 520, the device can request the missing files from the management server. At stage 525, the management server can send the missing files to the device. At stage 530, the device stores the received refresh process files to the recovery folder. Further details regarding the process of confirming the presence of the refresh process files and how any missing files can be requested are explained above with respect to FIGS. 1 and 2.

At stage 535, a first of the refresh process files—the back-up command file—can execute. The back-up command file can initiate a process of storing copies of installation files associated with one or more management applications and one or more managed applications to the recovery folder. As discussed above, the management applications can include an agent application, a workspace application, and a provisioning application. In some embodiments, these three applications are embodied in a single application.

The managed applications can include any application under management on the device, including but not limited to an email application, a WiFi application, a VPN application, a file manager application, and a word processor application.

In addition to the installation files for the management and managed applications, the back-up command file can also store copies of all device identification information in the recovery folder. The device identification information can include a device ID, one or more enrollment keys, and one or more authentication tokens for communicating with the management server. Importantly, the device identification information can contain all data needed to communicate with the management server through the management application(s), in one example.

At stage 540, once the device identification information and the installation files for the management and managed applications are stored in the recovery folder, the refresh process can partition a portion of the device hard drive in preparation for installing the new OS instance. The files and data contained in the recovery folder can be stored in the partitioned portion of the hard drive and the remainder of the hard drive can be reformatted. Moving the contents of the recovery folder to the partitioned portion of the hard drive ensures they are retained during the reformatting. A new instance of the OS can then be installed at the device following the reformatting of the hard drive.

Once the new instance of the OS is installed, the second of the refresh process files—the recovery command file—can execute at stage 545 without any further input from the user or the administrator. For example, execution of the recovery command file can be triggered by successful installation of the new OS instance or some other event indicating that the new OS instance is in place.

In some examples, the recovery command file ensures that information stored in the recovery folder is migrated from the partitioned portion of the device hard drive to the new OS instance. In one aspect, the recovery command file can direct the device processor to save copies of the device identification information and installation files associated with the management and managed applications within the new OS instance. The recovery command file may further include instructions to the processor regarding precisely where in the new OS instance to store each piece of information.

In some examples, the processor may not migrate copies of some of the recovery folder contents over to the new OS instance. For example, the processor may not migrate refresh process files, including the back-up command file, the recovery command file, and the unattended answer file to the new OS. Rather, the processor can execute those files from the recovery folder during the refresh process and those files can then be discarded when no longer needed. Alternatively, the processor can migrate those files over to the new OS instance based on instructions contained in the recovery command file and used in a future refresh process.

Once the new OS instance has been installed, the device is configured for the OOBE. During the OOBE, the user can login to the device and navigate a predetermined workflow to finalize the device configuration, apply settings, and complete any application installations. During the OOBE, at a stage 550, the processor can execute the third command file—the unattended answer file. Execution of the unattended answer file, in turn, causes the processor to execute a re-installation command file and a re-enrollment command file.

Execution of the unattended answer file, the re-installation command file, and the re-enrollment command file can be triggered upon commencement of the OOBE or by the occurrence of an event that occurs during the OOBE. In one aspect, the re-installation command file will execute the installation files associated with the management applications and managed applications that were previously migrated over to the new OS instance. The re-installation command file can contain information indicating where in the new OS instance to install each of these applications, as well as settings information to be applied to each application.

After installation of the management applications, at stage 555, the device processor can execute the re-enrollment command file. The device sends a request to the management server, using the newly-installed management agent application, that includes the device identification information necessary to re-enroll the device with the server. For example, the re-enrollment request can include the device ID, one or more enrollment keys, and one or more authentication tokens. At stage 560, the management server confirms the identity of the device and re-enrolls the device in the management platform.

In some embodiments, upon re-enrollment, the device may also request any available updates to the device's applications or settings from the management server at stage 565. The management server can determine if any such updates exist and, if so, send those updates to the device at stage 570. Alternatively, if no such updates exist, the management server may transmit a message that the device is currently up to date.

FIG. 6 depicts a method for resetting a managed device as opposed to refreshing it. A reset process can be employed when the managed device is changing hands from one user to another. For example, when a first employee leaves an enterprise and his device is wiped clean and provided to a new employee. Another example is when a first student graduates from a class at the end of the school year and her school-issued device is given to an incoming student the following school year. In these instances, it may be desirable to wipe a device completely clean. Doing so can delete any information that belonged to the former device holder, while avoiding spending a great deal of time reconstructing a management platform on the device.

At step 610, a request to reset the OS of a device is received at the device. Similar to the refresh process described above, an administrator console (and through a management server) or the device can initiate the reset request. Requesting the reset from the device may, in some examples, trigger a request to the management server, seeking authorization to reset the device. The approval can be sent back to the device from the administrator console, again through the management server.

At step 620, the device can confirm one or more reset process files are stored in a recovery folder of the device OS. The recovery folder can be preserved during the OS reset, as described in more detail with respect to the refresh process.

The reset process files can include an application cache, a recovery command file, and an unattended answer file containing an installation command file.

FIG. 7 depicts a process for confirming the presence of the reset process files in the recovery folder. At step 710, a request to reset the OS is received at the device. At step 720, the device can determine if the reset process files are present in the recovery folder. If they are present, then the process advances to step 760 and the reset process returns to step 630 of FIG. 6, described in more detail below.

If the reset process files are not present in the recovery folder, at step 730, the device can notify the administrator console, through the management server, that one or more reset process files are missing. More specifically, the device can determine whether each of an application cache, a recovery command file, and an unattended answer file containing an installation command file are present in the device recovery folder. Where one or more of such files are missing, the device can notify the administrator console and identify which files are missing. In a further embodiment, even when all the reset process files are present in the recovery folder, the device can request any updates to those files from the management server.

At step 740, an administrator can construct a cache of installation files associated with the management and managed applications to be installed for the next user. In some examples, the cache of applications includes installation files for one or more management applications, such as an agent application, a workspace application, and a provisioning application. In alternative examples, the agent, workspace, and provisioning application can all be embodied in a single application. The cache of applications can also include installation files for any applications that the administrator would like managed on the device, such as an email application, a WiFi application, a VPN application, a file manager application, and a word processor application.

After the cache of applications is constructed, at step 750, the cache can be transmitted to the device from the administrator console, through the management server. If any other reset process files were missing, those files can also be sent to the device at this stage. Upon receipt, the device can store the cache and any other missing reset process files in the recovery folder at step 760. The reset process can then continue.

Returning to FIG. 6, once it is confirmed that all the reset process files are stored in the recovery folder, the OS reset process continues to step 630. There, a portion of the hard drive of the device is partitioned and the recovery folder and its contents are saved in the partitioned portion. The information stored at the partitioned portion of the hard drive can be preserved during the OS refresh. The remainder of the hard drive can then be reformatted and a new instance of the OS can be installed there.

At step 640, the device processor can execute the recovery command file. In some examples, the recovery command file ensures that the processor migrates information stored in the recovery folder from the partitioned portion of the device hard drive to the new OS instance. The recovery command file can execute without any further input from the user or administrator beyond the initial request to reset the OS. For example, execution of the recovery command file can be triggered by completion of the installation of the new instance of the OS or some other event indicating that the new instance of the OS is in place. In particular, the installation files associated with the management and managed applications are migrated from the recovery folder to an appropriate location in the new OS instance. In some examples, the exact location at which each installation file will be stored in the new OS instance can be specified by the recovery command file and, often, will be reflective of the location that information was stored in the prior instance of the OS.

In some examples, some contents of the recovery folder will not be migrated to the new OS. For example, the recovery command file and the unattended answer file may not be migrated to the new OS. Rather, those files can be executed from the recovery folder during the reset process and may not be needed in the new OS instance. Alternatively, all the reset process files can be migrated upon execution of the recovery command file for use in a future reset process.

At step 650, an administrator can now login to the device in an "audit mode." Audit mode provides a way for an administrator to login to a device to ensure it is configured properly and has all desired software installed. It is contemplated that this step can occur after the previous user has returned their device but before the device has been distributed to its next user. For example, where the previous user is a student, this step can be conducted by an administrator or teacher in possession of the device prior to its distribution to another student the following year.

In audit mode, the unattended answer file, which can contain or reference the installation command file, can execute. As described with respect to other examples, the installation command file can then execute each installation file in the application cache without any input from the administrator or user. Rather, the unattended answer file and the installation command file can be triggered by the administrator logging into the device in audit mode or by the occurrence of an event that occurs during the audit process. The location of each new application within the new OS instance can be specified by the installation command file. The installation command file can also contain settings information to be applied to each of the management and managed applications following install.

While the process of installing each management and managed application from the application cache can take time, one advantage to the reset process described here is that the installation process is undertaken in a timeframe when the device is between users. For example, where a student turns her device in at the end of the school year, the installation of applications from the application cache can take place during the break from school and prior to the device being distributed to a new student.

At step 660, the device is now ready for a new user. Upon logging in, the user can be presented with OOBE. In some examples, during the OOBE, one or more additional elements of the new OS instance can be installed and one or more features of the device can be customized by the user. It is also during the OOBE that the user will be prompted through a device enrollment process. During the enrollment process, the user may provide information confirming his or her identity. Information may also be collected from the device by the management server to properly identify the device. In further examples, all steps will be taken to enroll the device in the managed platform and facilitate communication between the management server and the agent application installed on the device.

Once the device is enrolled in the management platform, at step 670, the device can also send a request to the management server for any application or settings updates that may have been received by the management server or the administrator console but have not yet been applied to the applications and settings of the device since the OS reset. If any such updates exist, the management server can transmit those updates to the agent application of the device for installation.

FIG. 8 depicts a sequence diagram of an example method for resetting the operating system of a device enrolled in a management platform. At stage 805*a*, a request to reset the OS is generated at administrator console. The request is received by a management server and transmitted to the appropriate device at stage 810*a*. In alternative examples, at stage 805*b*, the request to reset the OS is generated at the device rather than at the administrator console.

Regardless, at stage 815, the device confirms the reset process files are stored in the device's recovery folder. These files include, but are not limited to, an application cache, a recovery command file, and an unattended answer file. In some embodiments, the unattended answer file is associated with an installation command file.

If one or more of the reset process files are not found in the recovery folder, at stage 820, the device can request the missing files from the management server. This request can be passed on to the administrator console at stage 825.

At stage 830, an administrator at the administrator console constructs the application cache. In some examples, the application cache includes installation files associated with one or more management applications and one or more managed applications. The one or more management applications can include an agent application, a workspace application, and a provisioning application. The one or more managed applications can include any applications that the administrator would like managed on the device, such as an email application, a WiFi application, a VPN application, a file manager application, and a word processor application.

After the cache of applications is constructed, at stage 835, the application cache can be transmitted to the management server and then on to the device at stage 840. If any other reset process files were missing, such as the recovery command file or the unattended answer file, those files can also be sent to the device at stage 845. Upon receipt, the device can store the application cache and any other missing reset process files in the recovery folder at stage 850.

At stage 855, the device processor partitions a portion of the hard drive of the device. The processor can then save the recovery folder and its contents in the partitioned portion of the hard drive. The information stored at the partitioned portion of the hard drive can be preserved during the OS reset. The remainder of the hard drive can then be reformatted and a new instance of the OS is installed there.

At 860, the device processor executes the recovery command file, in some examples. The recovery command file migrates files and data stored in the recovery folder from the partitioned portion of the device hard drive to the new OS instance. The recovery command file can execute without any further input from the user or administrator beyond the initial request to reset the OS. For example, execution of the recovery command file can be triggered by completion of the installation of the new instance of the OS or some other event indicating that the new instance of the OS is in place. In particular, the installation files associated with the management and managed applications are migrated from the recovery folder to an appropriate location in the new OS instance. In some examples, the location at which each installation file will be stored in the new OS instance can be specified by the recovery command file.

An administrator can login to the device in an "audit mode" at stage 865. In audit mode, the unattended answer file can cause the installation command file to execute. The installation command file, in turn, can then execute each installation file in the application cache without any input from the administrator or user. The location of each new application within the new OS instance can be specified by the installation command file. The installation command file can also contain settings information to be applied to each of the management and managed applications following installation.

At stage 870, in some examples, the device is ready for a new user. Upon logging in, the user can be presented with OOBE. In some examples, during the OOBE, one or more additional elements of the new OS instance can be installed and one or more features of the device can be customized by the user. The user can also be prompted through a device enrollment process. During the enrollment process, at stage 875, the user can transmit information to the management server confirming his or her identity. Information may also be sent from the device to the management server to properly identify the device. In further examples, after sufficient information has been collected from the device, the management server can confirm device enrollment at stage 880.

At stage 885, the device can request any application or settings updates that may have been received by the management server or the administrator console but have not yet been applied to the applications and settings of the device since the OS reset. If any such updates exist, the management server can transmit those updates to the agent application of the device at stage 890.

FIG. 9 depicts a system 900 for performing the refresh and reset methods described above. In one aspect, system 900 can include an administrator console 910, a management server 920, and one or more managed devices 930. Management server 920 can include multiple servers, processors, and computing devices. In some examples, management server 920 is a network of servers, some of which can be located remotely from one another. In another example, management server 920 is a single server with multiple purposes. In yet another example, management server 920 is a server (or group of servers) dedicated to the operations described herein.

Management server 920 can be communicatively coupled to administrator console 910 via a network, such as the internet. An administrator can utilize console 910 to perform any of the functions described here. This can be accomplished using a graphical user interface ("GUI") at console 910. The administrator can access console 910 by, for example, navigating to a web location using a web browser on a computing device or accessing a standalone application on a computing device.

After the administrator has configured any device settings, command files, application caches, or compliance rules to be applied to a device 930, the console can transmit this information to management server 920. The information can also identify one or more devices to which it applies. Management server 920 can store a copy of this information for later recall and transmit a copy to device 930.

Devices 930 can be any computing device that includes a processor and a memory store, including a laptop or desktop computer, phone, tablet, or watch. Like administrator console 910, devices 930 can communicate with the management server 920 over a network, such as the internet. As described above with respect to the previous examples, device 930 can include an OS 935. A recovery folder 940 and a managed environment 945 can be stored within the OS 935. In some examples, managed environment 945 can include one or more managed applications and one or more managed applications.

In accordance with the examples presented here, a managed device can be refreshed or reset with minimal involvement by the user of the device or a system administrator. The described methods and systems allow for the OS of a managed device to be refreshed while retaining the necessary software components of the management platform and all information needed to re-establish communication between the refreshed device and a management server. Where the proper refresh and reset process files are already stored in the recovery folder of the device, the example methods and systems presented here also have the advantage of allowing a user to refresh or reset a device and re-install all software necessary to re-enroll the device in the management platform without an internet connection.

Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as illustrative only, with a true scope and spirit of the disclosure being indicated by the following claims.

What is claimed is:

1. A method for resetting the operating system of a device enrolled in a management platform, the method including:
    transmitting, from an administrator console, a cache of application installation files to a management server;
    transmitting, from the administrator console, a plurality of reset process files to the management server, the reset process files including a back-up command file, a recovery command file, a first unattended answer file, and a second unattended answer file;
    receiving, at the administrator console, a request to reset the operating system ("OS") of the device; and
    before initiating a reset of the OS of the device, confirming, at the administrator console, that the cache of application installation files and the plurality of reset process files have been transmitted from the management server to the device
    wherein the back-up command file stores device identification data and a management application installation file to a recovery folder in a partitioned portion of the device that is retained during the reset,
    wherein the recovery command file, executed during the reset, migrates the device identification data and the management application installation file from the partitioned portion of the device to a new instance of the device OS, and
    wherein the first unattended answer file causes the management application installation file to execute and the second unattended answer file re-enrolls the device with the management server based, at least in part, on the device identification data.

2. The method of claim 1, wherein the request to reset the OS originates from the administrator console.

3. The method of claim 1, wherein the request to reset the OS originates from the device.

4. The method of claim 1, wherein confirming that the cache of application installation files and the plurality of reset process files have been transmitted to the device includes confirming that the cache of application installation files are stored in the recovery folder of the device.

5. The method of claim 4, wherein the recovery command file is configured to migrate each application installation file in the cache of application installation files from device recovery folder to a predetermined location in the new instance of the OS of the device.

6. The method of claim 1, wherein the first unattended answer file is configured to:
execute during an audit mode initiated at the device; and
cause each of the installation files in the cache of application installation files to execute.

7. The method of claim 1, wherein the second unattended answer file is configured to:
execute during an out-of-box experience ("OOBE") initiated at the device; and
prompt a user through an enrollment process to enroll the device with the management server.

8. A non-transitory, computer-readable medium including instructions that, when executed by a processor, performs stages for resetting the operating system of a device enrolled in a management platform, the stages including:
transmitting, from an administrator console, a cache of application installation files to a management server;
transmitting, from the administrator console, a plurality of reset process files to the management server, the reset process files including a back-up command file, a recovery command file, a first unattended answer file, and a second unattended answer file;
receiving, at the administrator console, a request to reset the operating system ("OS") of the device; and
before initiating a reset of the OS of the device, confirming, at the administrator console, that the cache of application installation files and the plurality of reset process files have been transmitted from the management server to the device,
wherein the back-up command file stores device identification data and a management application installation file to a recovery folder in a partitioned portion of the device that is retained during the reset,
wherein the recovery command file, executed during the reset, migrates the device identification data and the management application installation file from the partitioned portion of the device to a new instance of the device OS, and
wherein the first unattended answer file causes the management application installation file to execute and the second unattended answer file re-enrolls the device with the management server based, at least in part, on the device identification data.

9. The non-transitory, computer-readable medium of claim 8, wherein the request to reset the OS originates from the administrator console.

10. The non-transitory, computer-readable medium of claim 8, wherein the request to reset the OS originates from the device.

11. The non-transitory, computer-readable medium of claim 8, wherein confirming that the cache of application installation files and the plurality of reset process files have been transmitted to the device includes confirming that the cache of application installation files are stored in the recovery folder of the device.

12. The non-transitory, computer-readable medium of claim 11, wherein the recovery command file is configured to migrate each application installation file in the cache of application installation files from device recovery folder to a predetermined location in the new instance of the OS of the device.

13. The non-transitory, computer-readable medium of claim 8, wherein the first unattended answer file is configured to:
execute during an audit mode initiated at the device; and
cause each of the installation files in the cache of application installation files to execute.

14. The non-transitory, computer-readable medium of claim 8, wherein the second unattended answer file is configured to:
execute during an out-of-box experience ("OOBE") initiated at the device; and
prompt a user through an enrollment process to enroll the device with the management server.

15. A system for resetting the operating system of a device enrolled in a management platform, the system including:
a memory storage including a non-transitory, computer-readable medium including instructions; and
a computing device including a processor that executes the instructions to carry out stages including:
transmitting, from an administrator console, a cache of application installation files to a management server;
transmitting, from the administrator console, a plurality of reset process files to the management server, the reset process files including a back-up command file, a recovery command file, a first unattended answer file, and a second unattended answer file;
receiving, at the administrator console, a request to reset the operating system ("OS") of the device; and
before initiating a reset of the OS of the device, confirming, at the administrator console, that the cache of application installation files and the plurality of reset process files have been transmitted from the management server to the device,
wherein the back-up command file stores device identification data and a management application installation file to a recovery folder in a partitioned portion of the device that is retained during the reset,
wherein the recovery command file, executed during the reset, migrates the device identification data and the management application installation file from the partitioned portion of the device to a new instance of the device OS, and
wherein the first unattended answer file causes the management application installation file to execute and the second unattended answer file re-enrolls the device with the management server based, at least in part, on the device identification data.

16. The system of claim 15, wherein the request to reset the OS originates from the administrator console.

17. The system of claim 15, wherein confirming that the cache of application installation files and the plurality of reset process files have been transmitted to the device includes confirming that the cache of application installation files are stored in the recovery folder of the device.

18. The system of claim 17, wherein the recovery command file is configured to migrate each application installation file in the cache of application installation files from device recovery folder to a predetermined location in the new instance of the OS of the device.

19. The system of claim 15, wherein the first unattended answer file is configured to:
execute during an audit mode initiated at the device; and
cause each of the installation files in the cache of application installation files to execute.

20. The system of claim 15, wherein the second unattended answer file is configured to:

execute during an out-of-box experience ("OOBE") initiated at the device; and prompt a user through an enrollment process to enroll the device with the management server.

* * * * *